United States Patent [19]

Gerken

[11] 4,170,473
[45] Oct. 9, 1979

[54] METHOD OF MAKING AND USING A WELDING CHILL

[75] Inventor: John M. Gerken, Chagrin Falls, Ohio

[73] Assignee: TRW Inc., Cleveland, Ohio

[21] Appl. No.: 869,285

[22] Filed: Jan. 13, 1978

[51] Int. Cl.² .......................... B22F 5/00; B23K 9/00
[52] U.S. Cl. .................................... 75/208 R; 75/200;
 75/222; 219/136; 219/137 R; 228/46; 228/222
[58] Field of Search ............... 228/46, 222; 75/208 R,
 75/222; 219/136, 137 R

[56] References Cited

U.S. PATENT DOCUMENTS

| 2,188,925 | 2/1940 | Ronay | 228/222 |
|---|---|---|---|
| 2,280,150 | 4/1942 | Hasse et al. | 228/46 |
| 3,138,009 | 6/1964 | McCreight | 75/222 |
| 3,350,078 | 10/1967 | Shultz et al. | 228/46 |
| 3,364,951 | 1/1968 | Burne et al. | 75/222 |

Primary Examiner—Brooks H. Hunt

[57] ABSTRACT

An improved welding chill is formed by covering a surface area of a part opposite from an area which is to be welded, with a body of powdered metal. The body of powdered metal is sintered while it is in engagement with the surface area of the part. This results in the accurate formation of a sintered metal chill member which is gas pervious, that is a chill member with spaces through which gas can flow. During a welding operation, an inert gas is conducted through the chill member to the surface area of the part against which the chill member is pressed to retard oxidation of the surface area.

11 Claims, 6 Drawing Figures

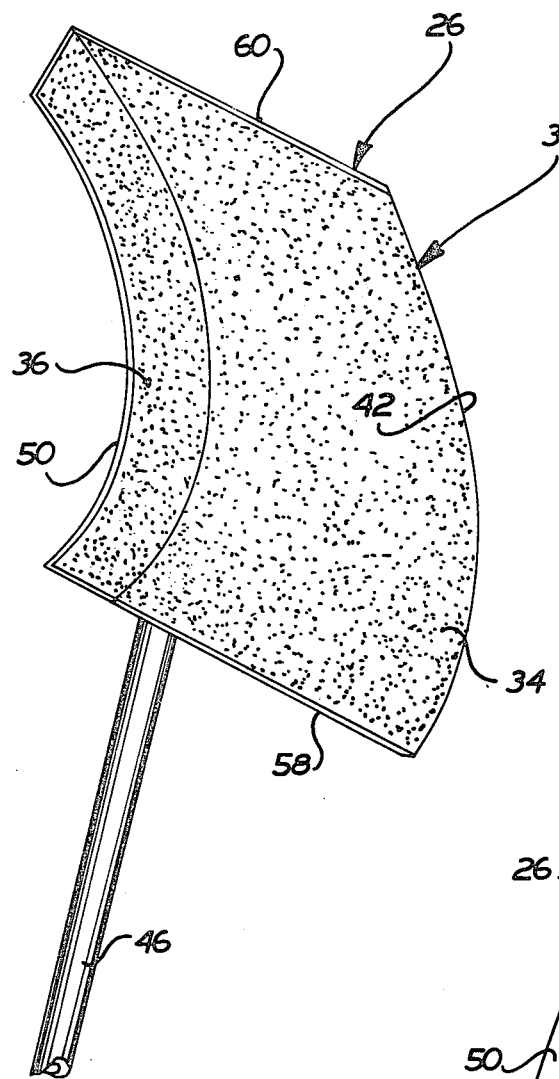
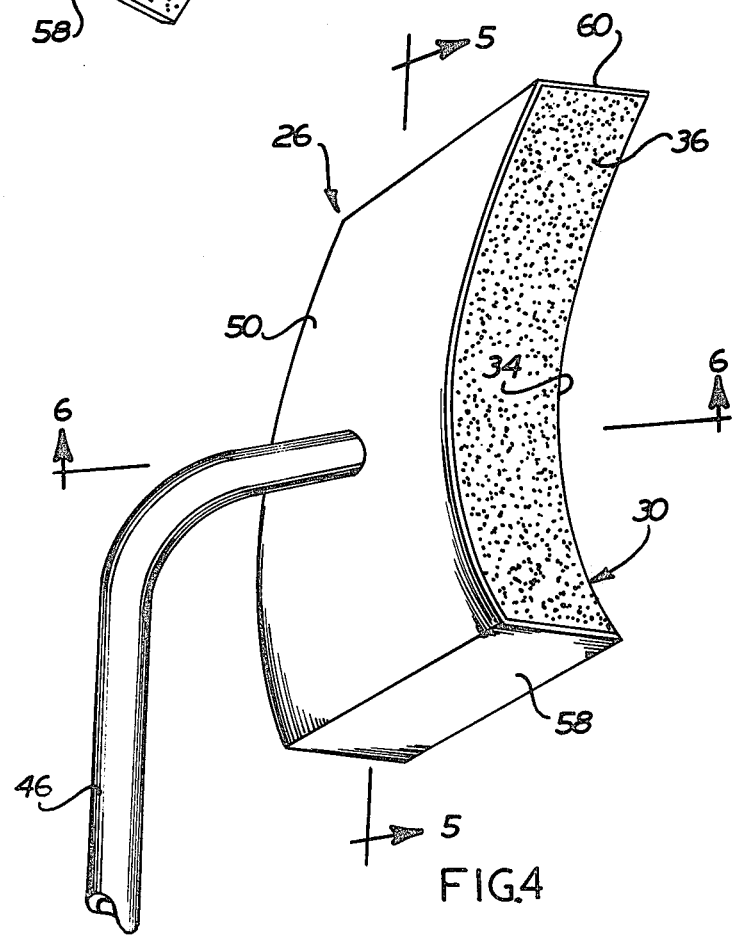
FIG.3
FIG.4

METHOD OF MAKING AND USING A WELDING CHILL

BACKGROUND OF THE INVENTION

Microcracks tend to form in thin areas of a heat effected zone of cast metal parts as they are repaired by being fusion welded. These cracks are visible during fluorescent pentetrant, visual, and/or X-ray inspection. It is believed that the formation of the cracks is the result of an excessive build-up of heat during welding of the thin areas of a part. The excessive heat causes the formation of cracks during cooling of the part. In addition, it has been noted that preferential oxidation of surfaces of the hot metal part tends to occur.

In an effort to eliminate the formation of microcracks, the fusion welding process has been conducted with a solid copper back-up or chill. In addition, a flow of an inert gas was directed around the part. However even with the solid copper back-up and the inert gas shielding, the microcracks were still visible during fluorescent penetrant and/or X-ray inspection.

SUMMARY OF THE PRESENT INVENTION

The present invention provides a new and improved method of making and using a welding chill. The welding chill is accurately formed by covering a surface area of a part with a body of powdered metal at a location opposite from a portion of the part which is to be welded. This powdered metal is sintered while it is held in place on the part. The resulting sintered metal chill member is accurately formed to have a shape corresponding to the shape of the surface area which is to be chilled. In addition, the chill member has passages through which gas can flow.

The sintered metal chill member is pressed against the side surface of the metal part while the opposite side is being welded. This results in the conduction of heat from the area around the weld. The conduction of heat from the part to the chill member is promoted by the fact that a surface area of the chill member has exactly the same shape as the surface area of the portion of the part which is engaged by the chill member.

During welding, an inert gas is conducted through the chill member to the surface area of the part against which the chill member is being pressed. This inert gas retards oxidation of the surface of the part. In order to prevent the escape of the inert gas from the sides of the chill member, the sides of the chill member which are not pressed against a surface of the part are covered with a gas impervious metal sheet. Although the present invention is particularly useful in repairing the thin webs of cast vane assemblies used in turbine engines, it is contemplated that the method can be used in association with many other types of parts.

Accordingly, it is object of this invention to provide a new and improved method of forming a weld chill member and wherein the method includes the steps of covering a surface area to be chilled with a body of powdered metal and sintering the powdered metal while it is in engagement with the surface area to form a sintered metal chill member.

Another object of this invention is to provide a new and improved method of welding by conducting an inert gas through a chill member to the surface of a part against which the chill member is being pressed while the part is being welded.

BRIEF DESCRIPTION OF THE DRAWINGS

The foregoing and other objects and features of the present invention will become more apparent upon a consideration of the following description taken in connection with the accompanying drawings wherein:

FIG. 3 is a pictorial illustration of the surface area of the sintered metal chill member which is pressed against the metal part during welding;

FIG. 4 is a pictorial illustration of the side of the chill member opposite from the side illustrated in FIG. 3;

DESCRIPTION OF A SPECIFIC PREFERRED EMBODIMENT OF THE INVENTION

A turbine engine vane assembly 10 includes a plurality of cast vanes 12 and 14. The vanes 12 and 14 have shroud sections 16 and 18. Casting defects in the shroud sections 16 and 18 are repaired by fusion welding.

During repair welding of the vane assembly 10, microcracks tend to form in the heat effected zone of the welds. This tendency for the formation of microcracks is particularly acute in thin web portions of the casting. In order to prevent the formation of microcracks, a chill 26 constructed in accordance with the present invention is used to prevent overheating of the vane assembly and to prevent preferential oxidation of the hot metal on the side of the vane assembly opposite from the welds.

Figure 1:
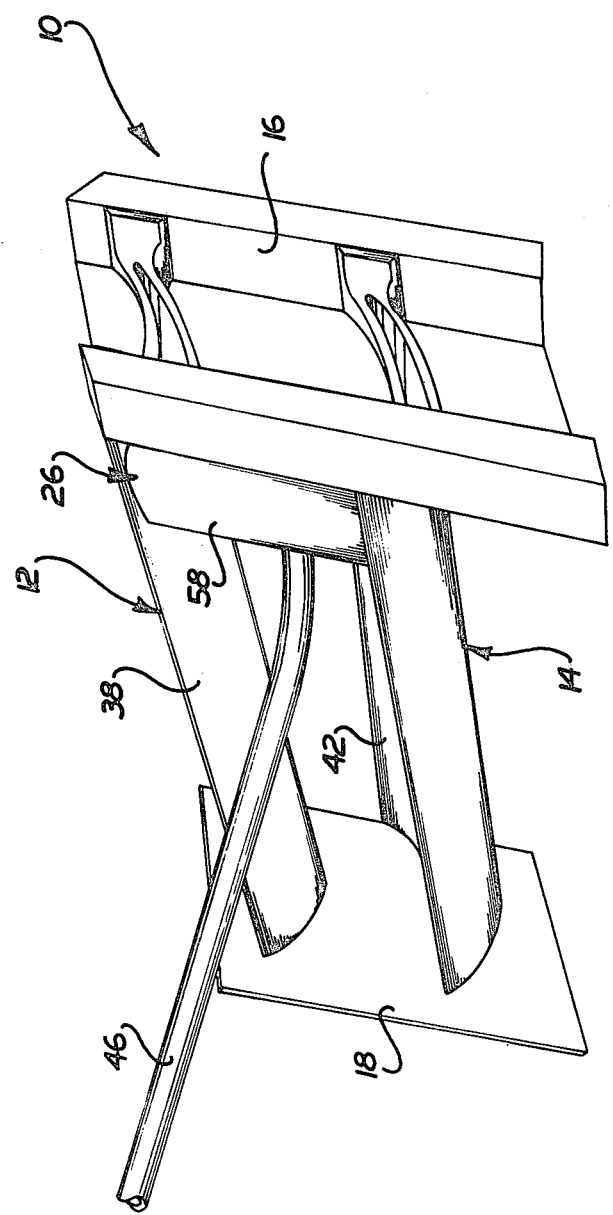
FIG. 1 is a pictorial illustration depicting the manner in which a sintered metal chill member constructed in accordance with the present invention is pressed against a metal part during welding of the part.
Figure 2:
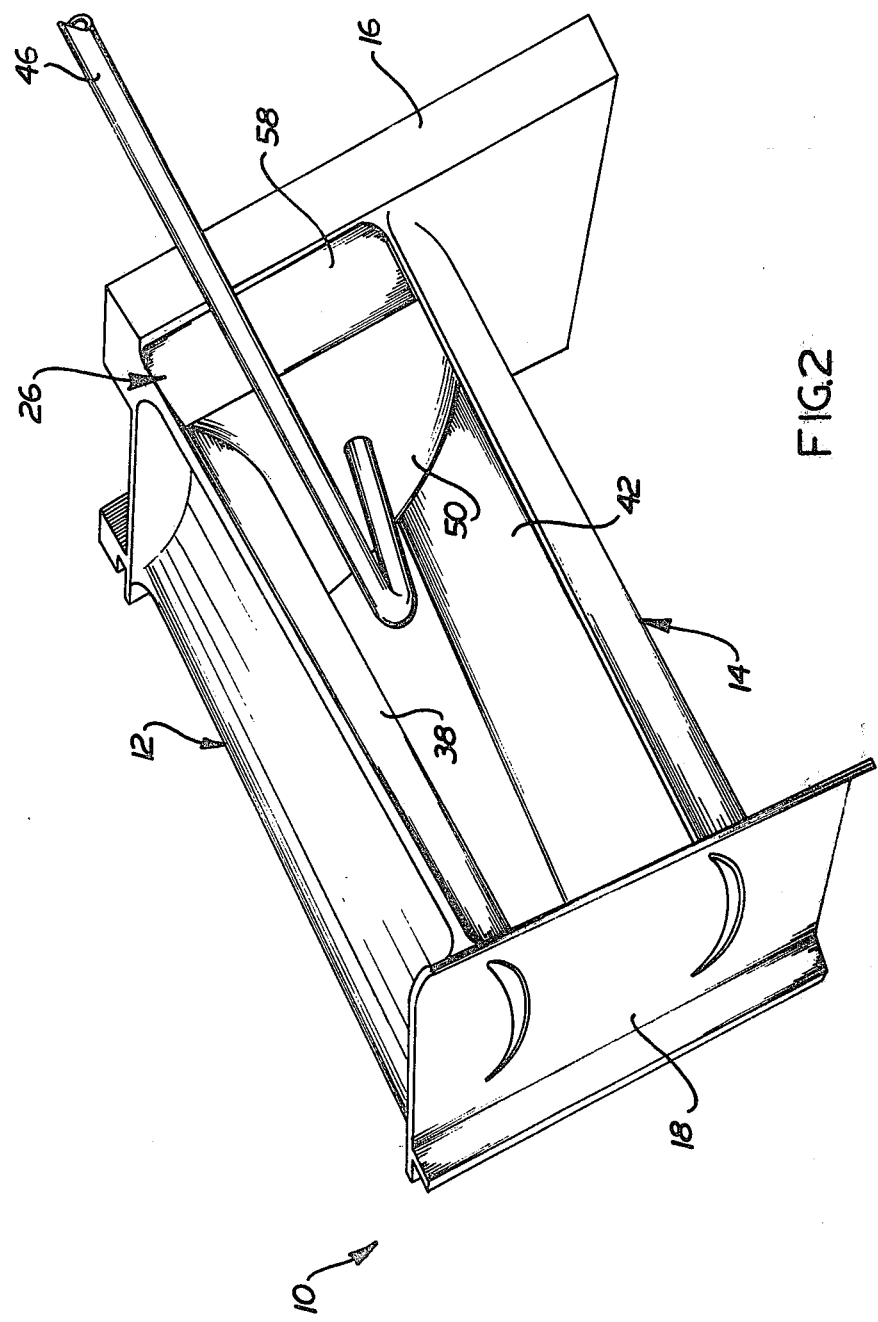
FIG. 2 is a pictorial illustration further illustrating the manner in which the chill member is pressed against the part.

The chill 26 includes a sintered metal body section 30 (see FIGS. 3 and 4) having a configuration which is the same as the configuration of the portion of the vane assembly 10 which is to be engaged by the chill. Thus, the body 30 of the chill 26 has a major side surface 34 (FIG. 3) with a configuration which corresponds to the configuration of the inner side surface of the shroud section 16 (FIGS. 1 and 2). In addition, the chill 26 has a minor side surface 36 with a configuration corresponding to the configuration of a convex side surface 38 of the vane 12 (see FIGS. 2 and 3). The opposite minor side surface 42 of the chill 26 has a configuration which corresponds to the configuration of a concave side surface 42 of the vane 14. Thus, the configuration of the chill 26 is such as to enable it to be pressed into firm abutting engagement with the surfaces of the vane assembly 10 in the manner shown in FIGS. 1 and 2 as the vane assembly is being welded.

Figure 5:
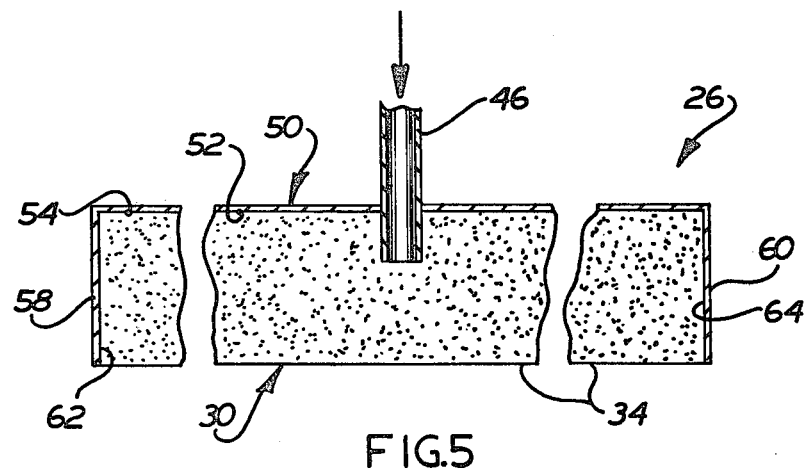
FIG. 5 is a fragmentary sectional view, taken generally along the line 5—5 of FIG. 4, schematically illustrating in the manner in which a flow of an inert gas is directed through the sintered metal chill member.
Figure 6:
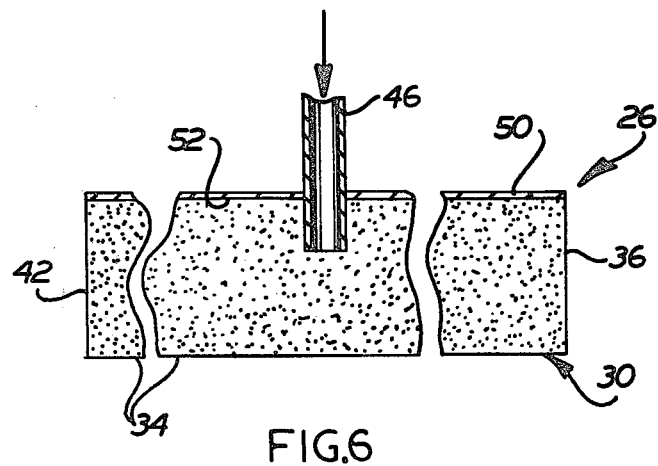
FIG. 6 is a fragmentary sectional view generally similar to FIG. 5 and further illustrating the manner in which an inert gas is directed through chill member.

In accordance with a feature of the present invention, the body 30 of the chill 26 is gas pervious. This enables inert gas to be directed through the chill 26 to the surfaces of the vane assembly 10 to prevent preferential oxidation of the vane assembly during welding. To provide for a flow of an inert gas from a source of gas pressure, a gas supply tube 46 is connected with the chill 26. The gas supply tube 46 extends into the sintered metal body of the chill 26 (see FIGS. 5 and 6). This enables the inert gas under pressure to flow to the major and minor side surfaces 34, 36 and 42 of the chill member 30. This flow of inert gas is effective to shield the surfaces of the turbine vane assembly 10 against which the chill 26 is pressed during a welding operation.

In order to prevent an undesired side flow of gas away from the surfaces of the vane assembly 10, the back and side sections of the sintered metal chill member 30 are covered with a gas impervious material. Thus, a metal plate 50 has a major side surface 52 which is connected with the back side surface 54 of the sintered metal chill member 30 (see FIGS. 5 and 6). Similarly, metal side panels 58 and 60 are connected to opposite side surfaces 62 and 64 of the chill member 30 (see FIG. 5).

The metal panels 50, 58 and 60 are impervious to gas flow and are effective to direct the flow of gas from the supply conduit 46 to the surfaces 34, 36 and 42 of the chill body 30. During a welding operation, the surfaces 34, 36 and 42 of the chill are disposed in tight abutting engagement with the surfaces of the vane assembly 10. The tight engagement of the surfaces of the chill body 30 with the vane assembly retards excessive leakage of the inert gas while promoting heat transfer from the vane assembly to the chill 26.

In accordance with another feature of the present invention, the chill body 30 is accurately formed to the shape of the vane assembly 10 by sintering a body of powdered metal while it is in engagement with the vane assembly. Thus, the chill body 30 is formed by placing a body of powdered metal against the vanes 12 and 14 and shroud section 16 in the area to be welded. This body of powdered metal is held in place by a pair of metal plates or dams positioned along opposite sides of the vane assembly.

While the body of powdered metal is in engagement with the vane assembly 10 and has a configuration which corresponds exactly to the configuration of the surface areas to be engaged by the chill 26, the powdered metal is sintered to form the rigid gas pervious body 30 of the chill 26. After the powdered metal has been sintered, the chill body 30 is removed from the vane assembly 10. Gas impervious outer side panels 50, 58 and 60 are connected with the gas pervious sintered metal body 30 in the manner illustrated in FIGS. 5 and 6. A hole is then drilled through the side panel 50 into the chill member 30 to receive the inert gas supply tube 46.

In one specific instance, the sintered metal chill member 34 was formed by holding a body of +100 mesh copper powder against the surfaces of the vane assembly 10 (FIGS. 1 and 2) with suitable metal plates or dams. This body of copper powder was approximately one inch deep as measured in a direction along the side surfaces 38 and 42 of the vanes 12 and 14. The body of copper powder was sintered in place at a temperature of approximately 1900° F. for approximately four hours in a vacuum of approximately $1 \times 10^{-3}$ torr.

After the copper powder had been sintered, the rigid chill body 30 was removed from the vane assembly 10. Copper sheets were shaped to cover the side surfaces 54, 62 and 64 of the sintered copper chill body 30. The sheet was welded in place at its edges. A hole approximately ¼ inch deep was formed in the center of the copper sheet 50 (FIGS. 5 and 6) to accommodate a ¼ inch diameter copper gas supply tube 46. The tube 46 was silver soldered in place.

During a subsequent welding operation, the sintered copper chill 26 was pressed firmly against the shroud section 16 with a suitable C-clamp. The gas supply tube 46 was connected with a supply of argon gas at a pressure of approximately 20 pounds per square inch. While the argon gas was through the tube 46 to the chill body 30 and the chill body was pressed firmly against the shroud section 16, the shroud section was repaired by fusion welding.

Although it is preferred to make the chill body 30 out of powdered copper, the chill body can be made out of powdered silver or other suitable metal. In addition, inert gases other than argon could be supplied through the tube 46. For example, the inert gas could be helium, hydrogen, nitrogen or carbon dioxide.

Although the best engagement between the chill 26 and the product to be welded is obtained by forming a sintered metal chill body 30 for each part by sintering powdered metal while it is resting on the part, it is contemplated that the chill body 30 may be used with more than one part. The use of the chill member with a plurality of parts is particularly feasible when the parts are precision cast and are made from the same tooling.

In view of the foregoing description, it is apparent that the present invention provides a new and improved method of making and using a welding chill 26. The body 30 of the welding chill 26 is accurately formed by covering a surface area of a part, such as the vane assembly 10, with a body of powdered metal at a location opposite from a portion of the part which is to be welded. This powdered metal is sintered while it is held in place on the part. The resulting sintered metal chill member 30 is accurately formed to have a shape corresponding to the shape of the surface area which is to be chilled. In addition, the chill member 30 has passages through which gas can flow.

The sintered metal chill member 30 is pressed against the side surface of a metal part, such as the vane assembly 10, while the opposite side is being welded. This results in the conduction of heat from the area around the weld. The conduction of heat from the part to the chill member 30 is promoted by the fact that the surface area of the chill member has exactly the same shape as the surface area of the portion of the part which is engaged by the chill member.

During welding, an insert gas is conducted through the chill member 30 to the surface area of the part against which the chill member is being pressed. This inert gas retards oxidation of the surface of the part. In order to prevent the escape of the inert gas from the sides of the chill member 30, the sides of the chill member are covered with gas impervious metal sheets 50, 58 and 60. Although the present invention is particularly useful when repairing the thin webs of cast vane assemblies which are used in turbine engines, it is contemplated that the method can be used in association with the welding of many different types of parts. It is also contemplated that the sintered metal chill member may, under certain circumstances, be used without directing a flow of inert gas through the chill member.

Having described one specific preferred embodiment of the invention, the following is claimed.

1. A method comprising the steps of providing a part which is to be welded on one side while a surface area on an opposite side is chilled, covering the surface area to be chilled with a body of powdered metal, sintering the body of powdered metal while it is in engagement with the surface area to be chilled to form a metal chill member, pressing the sintered metal chill member against the surface area to be chilled, and welding the part while performing said step of pressing the metal chill member against the surface area to be chilled.

2. A method as set forth in claim 1 further including the step of directing an inert gas through the chill member to the surface area to be chilled to retard oxidation of the part.

3. A method as set forth in claim 1 wherein said step of sintering the body of powdered metal includes the step of forming a plurality of spaces through which gas can flow through the chill member, said method further including the step of covering at least a portion of the surface of the sintered metal chill member with a gas impervious layer, and directing gas through the chill member toward the part while performing said step of welding the part.

4. A method as set forth in claim 1 further wherein after performing the foregoing steps performing the step of pressing the chill member against surface area of the parts having substantially the same configuration as the surface area of the part which was engaged by the powdered metal when it was sintered, and welding these other parts while pressing the chill member against them.

5. A method comprising the steps of forming a gas pervious chill member, pressing the gas pervious chill member against a surface area of a metal part, welding the metal part opposite the surface area against which the chill member is being pressed, and conducting an inert gas through the chill member to the surface area against which the chill member is being pressed while performing said step of welding the metal part.

6. A method as set forth in claim 5 further including the step of blocking a flow of gas from the chill member in a direction away from the surface area against which the chill member is being pressed while performing said step of welding the part.

7. A method as set forth in claim 5 further including the step of conducting heat from the part to the chill member while performing said step of welding the part.

8. A method as set forth in claim 5 wherein said step of forming a chill member includes the steps of providing a body of powdered metal and sintering the body of powdered metal to provide a sintered powdered metal chill member.

9. A method comprising the steps of providing a part which is to be welded on one side while a surface area on an opposite side is chilled, covering the surface area to be chilled with a body of powdered metal, sintering the body of powdered metal while it is in engagement with the surface area to be chilled to form a metal chill member, said step of sintering the body of powdered metal includes the step of forming a plurality of spaces through which gas can flow through the chill member, covering at least a portion of the surface of the sintered metal chill member with a gas impervious layer, pressing the sintered metal chill member against the surface area to be chilled, welding the part while performing said step of pressing the metal chill member against the surface area to be chilled, directing an inert gas through the chill member toward the part while performing said step of welding the part, and after performing the foregoing steps performing the steps of providing a plurality of other parts having substantially the same configuration as the surface area of the part which was engaged by the powdered metal when it was sintered, and welding these other parts while pressing the chill member against them and directing an inert gas through the chill member toward the other parts.

10. A method comprising the steps of forming a gas pervious chill member, pressing the gas pervious chill member against a surface area of a metal part, welding the metal part opposite the surface area against which the chill member is being pressed, conducting an inert gas through the chill member to the surface area against which the chill member is being pressed while performing said step of welding the metal part, blocking a flow of gas from the chill member in a direction away from the surface area against which the chill member is being pressed while performing said step of welding the part, and conducting heat from the part to the chill member while performing said step of welding the part.

11. A method of repairing a shroud section of a vane assembly, said method comprising the steps of placing a body of powdered metal against a first surface area of the shroud section, holding the body of powdered metal in place with members disposed along the shroud section, sintering the body of powdered metal while it is held in place in engagement with the first surface area of the shroud section, pressing the sintered body of powdered metal against the first surface area of the shroud section, directing a flow of gas through the sintered body of powdered metal toward the first surface area of the shroud section, and welding a second surface area of the shroud section while performing said steps of pressing the sintered body of powdered metal against the first surface area of the shroud section and directing a flow of gas toward the first surface area of the shroud section.

* * * * *